(12) United States Patent
Reinert et al.

(10) Patent No.: US 11,685,205 B2
(45) Date of Patent: Jun. 27, 2023

(54) METHODS AND APPARATUS FOR A HITCH INCLUDING MULTIPLE PINS COUPLED TO AN OUTBOARD FRAME

(71) Applicant: Ford Global Technologies, LLC, Dearborn, MI (US)

(72) Inventors: Bryce Reinert, Frankenmuth, MI (US); Kevin Stanton Giaier, Sylvan Lake, MI (US); Andrew Niedert, New Hudson, MI (US); Carl Montgomery, Madison Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 269 days.

(21) Appl. No.: 16/996,150

(22) Filed: Aug. 18, 2020

(65) Prior Publication Data

US 2021/0053406 A1   Feb. 25, 2021

Related U.S. Application Data (60) Provisional application No. 62/890,455, filed on Aug. 22, 2019.

(51) Int. Cl.
*B60D 1/48* (2006.01)
*B60D 1/24* (2006.01)
*B60D 1/145* (2006.01)

(52) U.S. Cl.
CPC ............. *B60D 1/485* (2013.01); *B60D 1/248* (2013.01); *B60D 1/145* (2013.01); *B60D 1/488* (2013.01)

(58) Field of Classification Search
CPC ................................ B60D 1/248; B60D 1/485
See application file for complete search history.

(56) References Cited

U.S. PATENT DOCUMENTS

| | | | |
|---|---|---|---|
| 8,966,998 B2 | 3/2015 | Gentner | |
| 9,096,179 B2 | 8/2015 | Reiseder | |
| 9,150,061 B2 | 10/2015 | Riehle | |
| 11,014,417 B2 * | 5/2021 | Reed | G01L 5/0004 |
| 2019/0265112 A1 * | 8/2019 | Reed | G01L 3/102 |
| 2019/0381844 A1 * | 12/2019 | Niedert | B60D 1/248 |
| 2020/0198422 A1 * | 6/2020 | Niedert | B60D 1/485 |
| 2021/0039457 A1 * | 2/2021 | Niedert | B60D 1/485 |
| 2022/0242180 A1 * | 8/2022 | Giaier | B60D 1/485 |

FOREIGN PATENT DOCUMENTS

| WO | WO-2018171937 A1 * | 9/2018 | ............ B60D 1/248 |
|---|---|---|---|
| WO | 2018171937 | 11/2018 | |

* cited by examiner

*Primary Examiner* — Kevin Hurley
(74) *Attorney, Agent, or Firm* — Lorne Forsythe; Hanley, Flight & Zimmerman LLC (57) ABSTRACT

Methods and apparatus for a hitch including multiple pins coupled to an outboard frame are disclosed. An example apparatus disclosed herein include a hitch including a first pin, a second pin parallel to the first pin, a third pin orthogonal to the first pin, and a fourth pin parallel to the third pin, wherein the first pin, the second pin, the third pin and the fourth pin are to couple the hitch to a frame of a vehicle. The example apparatus includes a load manager to determine a load condition based on sensor data from at least one of the first pin, the second pin, the third pin, or the fourth pin.

18 Claims, 9 Drawing Sheets

METHODS AND APPARATUS FOR A HITCH INCLUDING MULTIPLE PINS COUPLED TO AN OUTBOARD FRAME

RELATED APPLICATION

This patent claims priority to U.S. Provisional Patent No. 62/890,455, which was filed on Aug. 22, 2019, and is entitled "METHODS AND APPARATUS FOR A HITCH INCLUDING MULTIPLE PINS COUPLED TO AN OUTBOARD FRAME." U.S. Provisional Patent 62/890,455 is hereby incorporated herein by reference in its entirety.

FIELD OF THE DISCLOSURE

This disclosure relates generally to vehicle hitches and, more particularly, to methods and apparatus for a hitch including multiple pins coupled to an outboard frame.

BACKGROUND

In recent years, consumer vehicles capable of pulling trailers have implemented additional data processing capabilities. With these capabilities, vehicles can process parameters of a vehicle and/or trailer not previously processed to provide additional insights to a user of the vehicle. For example, an additional parameter of the vehicle that can be processed is the load condition experienced at a hitch. The load condition includes various characteristics (e.g., weight, load orientation, braking force, sway force, etc.) experienced by the hitch.

Different vehicle models often have different configurations, including spare tire placement, fuel tank placement, floorboard height, frame rail spacing, etc. As a result, the hitch design may vary significantly between model types. Regardless of the specific model of a vehicle, vehicle hitches generally include a receiver tube and a crossbar. The receiver tube of a hitch is used to couple a towing element (e.g., a hitch ball, a drawbar, etc.) to the vehicle and often has a square cross-section. A crossbar is a tube connecting the driver and passenger sides of a vehicle frame to the receiver tube. Crossbars often have simple geometric cross-sections, such as a circle or a square.

SUMMARY

An example apparatus disclosed herein includes a hitch including a first pin, a second pin parallel to the first pin, a third pin orthogonal to the first pin, and a fourth pin parallel to the third pin, wherein the first pin, the second pin, the third pin and the fourth pin are to couple the hitch to a frame of a vehicle, and a load manager to determine a load condition based on sensor data from at least one of the first pin, the second pin, the third pin, or the fourth pin.

An example apparatus disclosed herein includes a load block, a first mounting ear extending from the load block, a second mounting ear extending from the load block, a pin adapter to be coupled to a vehicle frame, a first pin coupled to the pin adapter and the first mounting ear, and a second pin coupled to the pin adapter and the second mounting ear.

An example method disclosed herein includes determining a load condition of a hitch based on data received from at least one of a first pin, a second pin, a third pin or a fourth pin of the hitch, the first pin, the second pin, the third pin, and the fourth pin form a load path between the hitch and a frame of a vehicle, the first pin parallel to the second pin, the first pin orthogonal to the third pin, and in response to the load condition satisfying an alert threshold, alerting a user of the load condition.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Various terms are used herein to describe the orientation of features. As used herein, the term "vertical" refers to the direction orthogonal to the ground (e.g., the driving surface of a vehicle, etc.). As used herein, the term "horizontal" refers to the direction parallel to the direction of travel of the vehicle. As used herein, the term "lateral" refers to the direction orthogonal to the vertical and horizontal directions. As used herein, the orientation of features, forces and moments are described with reference to the vertical axis, horizontal axis, and lateral axis of the vehicle associated with these features, forces and moments.

Many vehicle hitch designs are specific to individual vehicle models and, thus, can require the hitch to have unique shapes and parts specific to each vehicle model. Variations in hitch design between vehicle models can be attributed to the shape of the rear bumper housing, packaging requirements for the spare tire, floorboard height, frame rail spacing, etc. These variations in hitch design increase the difficulty of packaging force-sensing elements (e.g., pin(s), strain gauge(s), etc.) into a hitch. For example, each hitch design can require specifically designed force-sensing elements, which can increase manufacturing cost and reduce availability of replacement parts. Additionally, in some examples, hitches including force sensing elements require significant packaging area that can negatively affect vehicle length, vehicle departure angle, and spare tire placement. Accordingly, packaging force sensing elements in proximity to the receiver tube of a hitch (e.g., above the receiver tube, below the receiver tube, within the receiver tube, etc.) may not be possible for some vehicle configurations.

In some examples disclosed herein, load sensing pins are used to determine the load condition of a trailer on a vehicle. Other load sensing elements such as pressure sensors, piezoelectric sensors, etc. are specifically tailored to the hitch (e.g., the hitch ball diameter, etc.) or the interaction between the vehicle and the trailer (e.g., ride height differences between the vehicle and trailer, etc.). Because hitch ball diameter and/or drawbar length varies with the coupled trailer, use of pressure sensors and piezoelectric sensors may not be practical. Accordingly, the examples disclosed herein include load sensing pins that can be implemented on any vehicle and trailer configuration.

Examples disclosed herein address the above-noted problems by determining a load condition of the trailer hitch receiver with a plurality of sensor pins coupling a trailer hitch to the frame of a vehicle. In some examples disclosed herein, two symmetric pin assemblies are coupled to the vehicle frame on opposite sides of the vehicle (e.g., the passenger side, the driver side, etc.). In some examples disclosed herein, each pin assembly includes two pins acting as the only load path between the hitch and the vehicle frame. In some examples disclosed herein, the pins of each pin assembly are oriented orthogonally relative to each other. In some examples disclosed herein, the configuration of the sensor pins enables a load condition experienced at the hitch to be determined without determining the geometry of the towing elements coupled to the hitch and/or the location of the hitch ball. In some examples disclosed herein, the pin assembly replaces a bracket coupling the hitch and the frame.

Figure 1A:
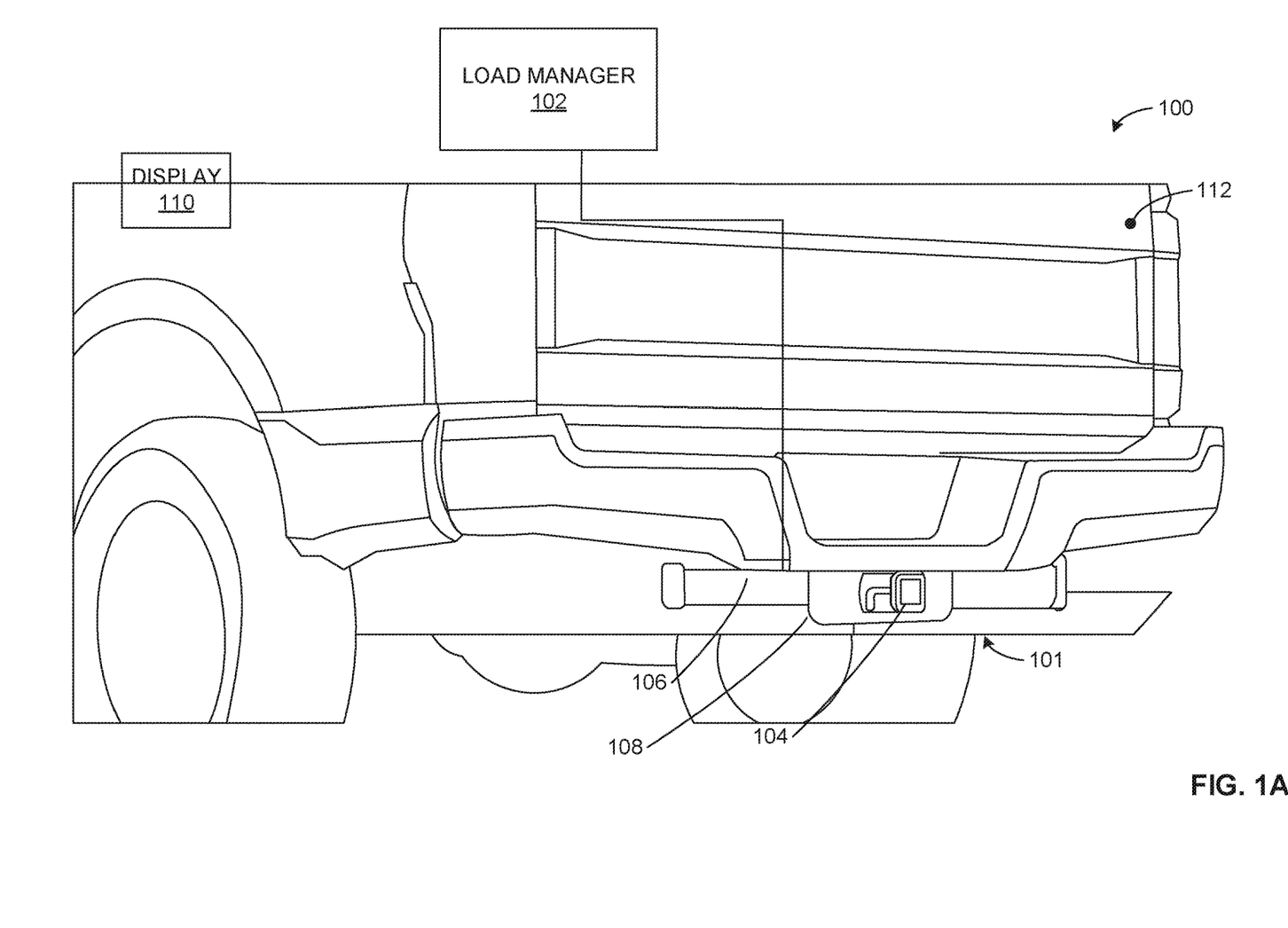
FIG. 1A illustrates an example vehicle including a hitch pin load manager and a hitch including load sensing pins by which the examples disclosed herein may be implemented.

FIG. 1A illustrates an example vehicle 100 including an example hitch 101 and an example load manager 102 by which the examples disclosed herein may be implemented. In the illustrated example of FIG. 1A, the hitch 101 includes an example receiver tube 104, an example crossbar 106 and an example chain bracket 108. The load manager 102 is communicatively coupled to at least one of an example display 110 and/or an example camera 112.

In the illustrated example of FIG. 1A, the vehicle 100 can tow a trailer coupled to the vehicle 100 via the example hitch 101. For example, a tow ball can be coupled to the hitch 101 via the receiver tube 104. The coupled tow ball enables a trailer to be pivotally coupled to the hitch 101. In the illustrated example, the vehicle 100 is a consumer automobile. In other examples, the vehicle 100 can be a commercial truck, a motorcycle, a motorized cart, an all-terrain vehicle, a motorized scooter, a locomotive, or any other vehicle.

The load manager 102 receives load information (e.g., forces, torques, etc.) from the sensor pins of the hitch 101. In some examples, the load manager 102 can analyze the received load information to determine a load condition of the vehicle 100 and/or the hitch 101. For example, the load manager 102 can determine a vertical load condition (e.g., a load condition in a direction orthogonal to the ground), a horizontal load condition (e.g., a load condition in a direction parallel to the receiver tube 104, etc.) and/or a lateral load condition (e.g., a load condition in a direction parallel to the crossbar 106, etc.). In some examples, if the load condition satisfies an alert threshold, the load manager 102 can generate an alert to indicate to a user of the vehicle 100 that the vehicle 100 is improperly loaded.

The crossbar 106 is a structural element that transfers load applied at the receiver tube 104 to the vehicle 100. In the illustrated example, the crossbar 106 has a quadrilateral cross-section. In other examples, the example crossbar 106 can have any other suitable cross-section (e.g., polygonal, circular, ovoid, etc.). In the illustrated example, the example crossbar 106 is a single continuous tube. In other examples, the crossbar 106 can be two tubes bisected by the receiver tube 104 and/or an assembly coupled to the receiver tube 104.

The chain bracket 108 acts as redundant attachment point between the hitch 101 and a coupled trailer. For example, one or more chains or similar mechanical elements can be coupled to the hitch 101 and the chain bracket 108. In operation, if the primary coupling between the trailer and the hitch 101 fails (e.g., the coupling via the receiver tube 104, etc.), the chain(s) prevent the trailer from becoming detached from the hitch 101.

The load manager 102 can be communicatively coupled to the example display 110. In some examples, the display 110 can be within an interior of the vehicle 100 (e.g., a dashboard display, an overhead display, etc.). Additionally or alternatively, the display 110 can be included in a mobile device (e.g., a smartphone, a tablet, a smartwatch, etc.) of an operator or a passenger of the vehicle 100. In some examples, the display 110 can present (e.g., display, etc.) the load condition determined by the load manager 102. In some examples, the display 110 can present (e.g., display, etc.) an alert to a user of the vehicle 100 when a load condition satisfies an alert threshold. Additionally or alternatively, the alert can be presented via a speaker associated with the display 110.

In the illustrated example of FIG. 1A, the load manager 102 is additionally coupled to the camera 112. In some examples, the camera 112 is mounted on an exterior surface of the vehicle 100 (e.g., the camera 112 is a backup assistance camera, etc.). In other examples, the camera 112 can be coupled (disposed within) any other suitable location of the hitch 101 and/or the vehicle 100. In some examples, an output of the camera 112 can be used to determine the orientation of a trailer coupled to the hitch 101.

Figure 1B:
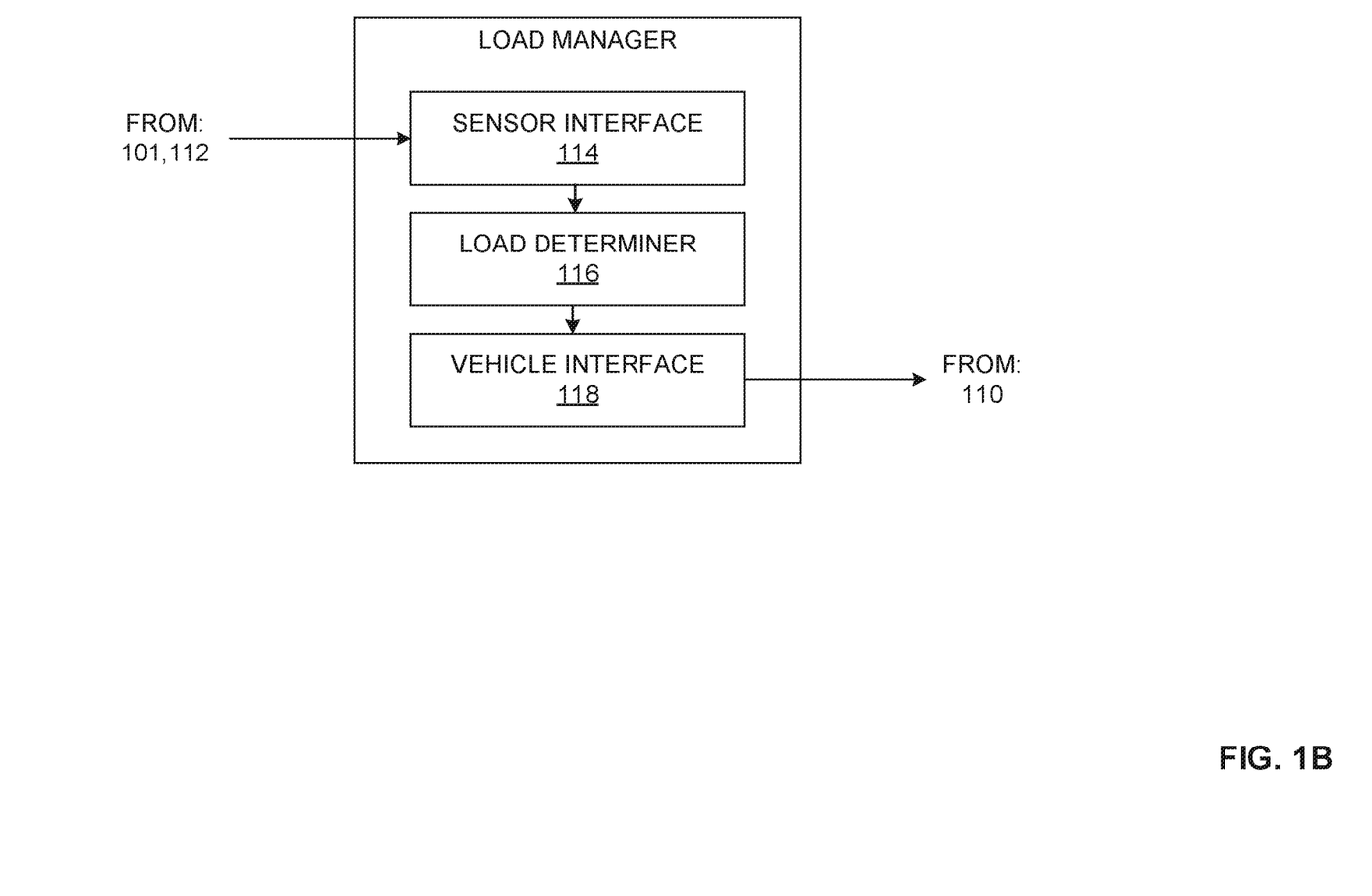
FIG. 1B is a block diagram of the example load manager of FIG. 1A.

FIG. 1B is a block diagram of the example load manager of FIG. 1A. In the illustrated example of FIG. 1B, the load manager 102 includes an example sensor interface 114, an example load determiner 116, and an example vehicle interface 118.

The example sensor interface 114 receives data from the pins of the hitch 101, the camera 112, or any other components of the vehicle 100 and/or hitch 101. In some examples, the sensor interface 114 can convert the received data from the components into a numerical form (e.g., human readable, etc.). For example, if a load-sensing pin outputs an analog signal (e.g., an analog voltage, an analog current, etc.) the sensor interface 114 can convert the received data into values corresponding to the loads detected by the hitch 101.

The example load determiner 116 analyzes the received load signal(s) received by the sensor interface 114 to determine the vertical load condition of the vehicle 100, the horizontal load condition of the vehicle 100 and/or the lateral load condition of the vehicle 100. For example, the load determiner 116 can use static equilibrium analysis (e.g., force balancing, moment balancing, etc.) to determine the load condition of the vehicle 100. In some examples, the load determiner 116 can determine if at least one of the load conditions satisfies an alert threshold. In some examples, the alert threshold corresponds to an improper (e.g., misload, unbalanced, etc.) load condition.

The example vehicle interface 118 generates a notification to be presented to a user of the vehicle 100. For example, the vehicle interface 118 can generate an alert if the load determiner 116 determines that an alert threshold is satisfied. In some examples, the vehicle interface 118 can generate a visual alert to be presented to the user via the display 110. Additionally or alternatively, the vehicle interface 118 can generate an auditory alert to be presented to the user (e.g., the alert may be presented over speakers of the vehicle 100, a mobile device of the user, etc.). In some examples, the vehicle interface 118 can generate instructions indicating to the user how to correct the load condition. In some examples, the vehicle interface 118 can enable the load manager to receive data from the vehicle. For example, the vehicle interface 118 can receive the drawbar dimensions from the vehicle 100 (e.g., input by a user into the interface of the vehicle 100, etc.). In some examples, the vehicle interface 118 can receive data from sensors associated with the vehicle 100 (e.g., accelerometers, ride height sensors, etc.). In such examples, the load determiner 116 can further base the load condition on data from the other sensors of the vehicle 100 and/or the location and geometry of the coupled drawbar/trailer ball.

While an example manner of implementing the load manager 102 of FIG. 1A is illustrated in FIG. 1B, one or more of the elements, processes and/or devices illustrated in FIG. 1B may be combined, divided, re-arranged, omitted, eliminated and/or implemented in any other way. Further, the example sensor interface 114, the example load determiner 116, and the example vehicle interface 118 and/or, more generally, the example load manager 102 of FIG. 1B may be implemented by hardware, software, firmware and/or any combination of hardware, software and/or firmware. Thus, for example, any of the example sensor interface 114, the example load determiner 116, and the example vehicle interface 118 and/or, more generally, the example load manager 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 114, the example load determiner 116, and the example vehicle interface 118 is/are hereby expressly defined to include a non-transitory computer readable storage device or storage disk such as a memory, a digital versatile disk (DVD), a compact disk (CD), a Blu-ray disk, etc. including the software and/or firmware. Further still, the example load manager 102 of FIGS. 1A and 1B may include one or more elements, processes and/or devices in addition to, or instead of, those illustrated in FIG. 1B, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
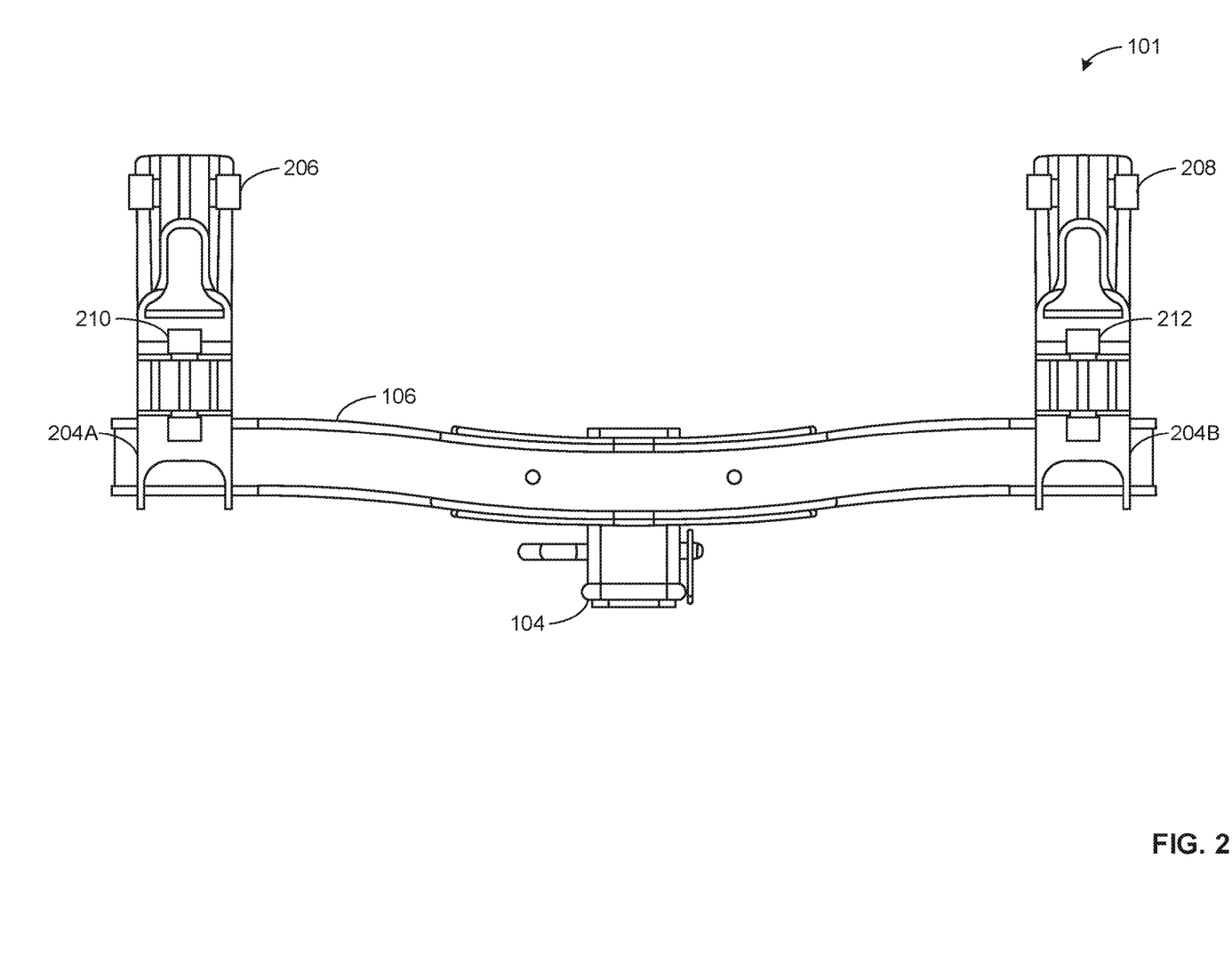
FIG. 2 illustrates a top view of the hitch of FIG. 1A.

FIG. 2 illustrates an isometric view of illustrates a top view of the hitch 101 of FIG. 1 in which the examples disclosed herein can be implemented. In the illustrated example, the hitch 101 includes the example receive receiver tube 104, the example crossbar 106, an example first load block 204A, an example second load block 204B, an example first pin 206, an example second pin 208, an example third pin 210, and an example fourth pin 212.

The load blocks 204A, 204B transfer load from the crossbar (e.g., from the coupled trailer, etc.) to the frame via the pins 206, 208, 210, 212. In the illustrated example, the load blocks 204A, 204B are coupled to the crossbar 106 via welds. In other examples, the load blocks 204A, 204B can be coupled to the crossbar via any other suitable means (e.g., fasteners, press-fit, etc.). In the illustrated example, the load blocks 204A, 204B are composed of cast iron. In other examples, the load blocks 204A, 204B can be any other suitable material or combination thereof (e.g., aluminum, steel, a plastic, a ceramic, etc.). In some examples, the load blocks 204A, 204B are manufactured via stamping. In other examples, the load blocks 204A, 204B can be manufactured via any suitable manufacture or combination thereof (e.g., weldment, casting, extrusion, etc.). While one example implementation of the load blocks is illustrated in FIG. 2, the load blocks 204A, 204B can have any other suitable shape and/or size, etc.

In the illustrated example of FIG. 2, the first pin 206 and the second pin 208 are oriented parallel to the crossbar (e.g., the lateral direction, etc.) and the third pin 210 and the fourth pin 212 are oriented parallel to the direction of travel of the vehicle (e.g., the horizontal direction, etc.). In the illustrated example of FIG. 2, the pins 206, 208, 210, 212 are load sensing pins. In some examples, the pins 206, 208, 210, 212 act as cylindrical joints (e.g., constrain two translation degrees of freedom and two rotational degrees of freedom, etc.) and are not able to detect loads applied in the same direction as their orientation. In this manner, the first pin 206 and the second pin 208 do not measure forces applied in the lateral direction and the third pin 210 and the fourth pin 212 do not measure forces applied in the horizontal direction. In some examples, some or all of the pins 206, 208, 210, 212 do not include sensor elements. For example, one of the horizontal pins (e.g., the pins 210, 212, etc.) may not include sensor elements and/or one of the lateral pins may not include sensor elements. In such examples, the load manager 102 can use additional parameters to calculate the load condition of the hitch 101 (e.g., the location of a hitch ball, etc.). In other examples, the load manager 102 can be calibrated during manufacture to determine the load condition of the hitch 101 using the pins including sensor elements. In some examples, the load manager 102 can calculate the load condition based on an assumption that the load is evenly distributed between the first load block 204A and the second load block 204B.

The pins 206, 208, 210, 212 are disposed within the hitch 101. In the illustrated example of FIG. 2, the pins 206, 208, 210, 212 have circular cross-sections. In other examples, the pins 206, 208, 210, 212 can have any other suitable cross-sectional shapes (e.g., a square cross section, an oblong cross section, etc.). In some examples, the first pin 206, the second pin 208, the third pin 210 and/or the fourth pin 212 can have a hollow cross-section. In other examples, any or all of the pins 206, 208, 210, 212 can have any other suitable cross-section (e.g., solid, etc.). In some examples, the diameter of the pins 206, 208, 210, 212 can be changed depending on the load rating of the hitch 101. For example, if the hitch 101 is designed to tow a relatively heavy load, the pins 206, 208, 210, 212 can have an appropriate larger diameter. In some examples, to enable modularity of the hitch 101, the diameters and/or lengths of the pins 206, 208, 210, 212 can be incremented and selected based on a tow capacity of the hitch 101 (e.g., a hitch with a larger tow capacity may use pins with a large diameter, etc.).

In the illustrated example, the first pin 206, the second pin 208, the third pin 210 and/or the fourth pin 212 have the same shape and diameter. In some examples, each of the pins 206, 208, 210, 212 is composed of a ferrous material (e.g., high strength steel, etc.). In other examples, any or all of the pins 206, 208, 210, 212 can be composed of any other suitable material. In some examples, the first pin 206, the second pin 208, the third pin 210 and/or the fourth pin 212 can have different diameters, lengths, cross-sections and/or load ratings. In some examples, some or all of the first pin 206, the second pin 208, the third pin 210 and/or the fourth pin 212 can have additional sensors (e.g., accelerometers, temperature sensors, magnatraction sensors, etc.).

Figure 3:
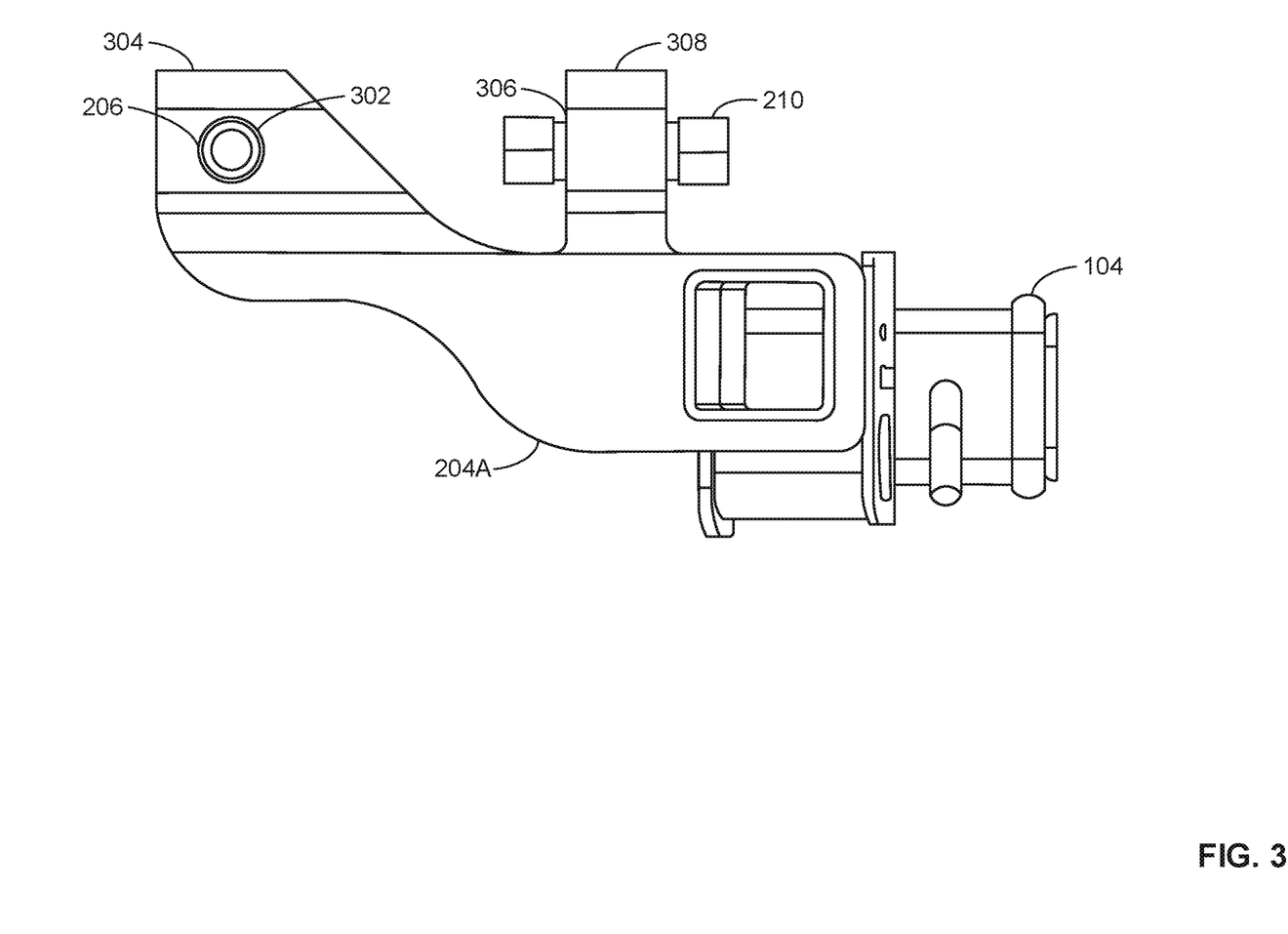
FIG. 3 illustrates a side view of the load block of FIG. 2.

FIG. 3 illustrates a side view of the load block 204A of FIGS. 1-2. In the illustrated example of FIG. 3, the first pin 206 is inserted into the load block 204A via an example first opening 302 in an example first mounting ear 304. In the illustrated example of FIG. 3, the third pin 210 is inserted into the load block 204A via an example second opening 306 in an example second mounting ear 308.

In the illustrated example of FIG. 3, the mounting ears 304, 308 extend from the base of the load block 204A. In some examples, the mounting ears 304, 308 and load block 204A are a unitary part. In other examples, the mounting ears 304, 308 are separate parts coupled to the load block 204A (e.g., via weld, via a press fit, etc.). In the illustrated example of FIG. 3, the pins 206, 210 are at substantially the same vertical position. In the illustrated example of FIG. 3, the opening 302 is oriented along the lateral axis and the opening 306 is oriented along the horizontal axis.

Figure 4:
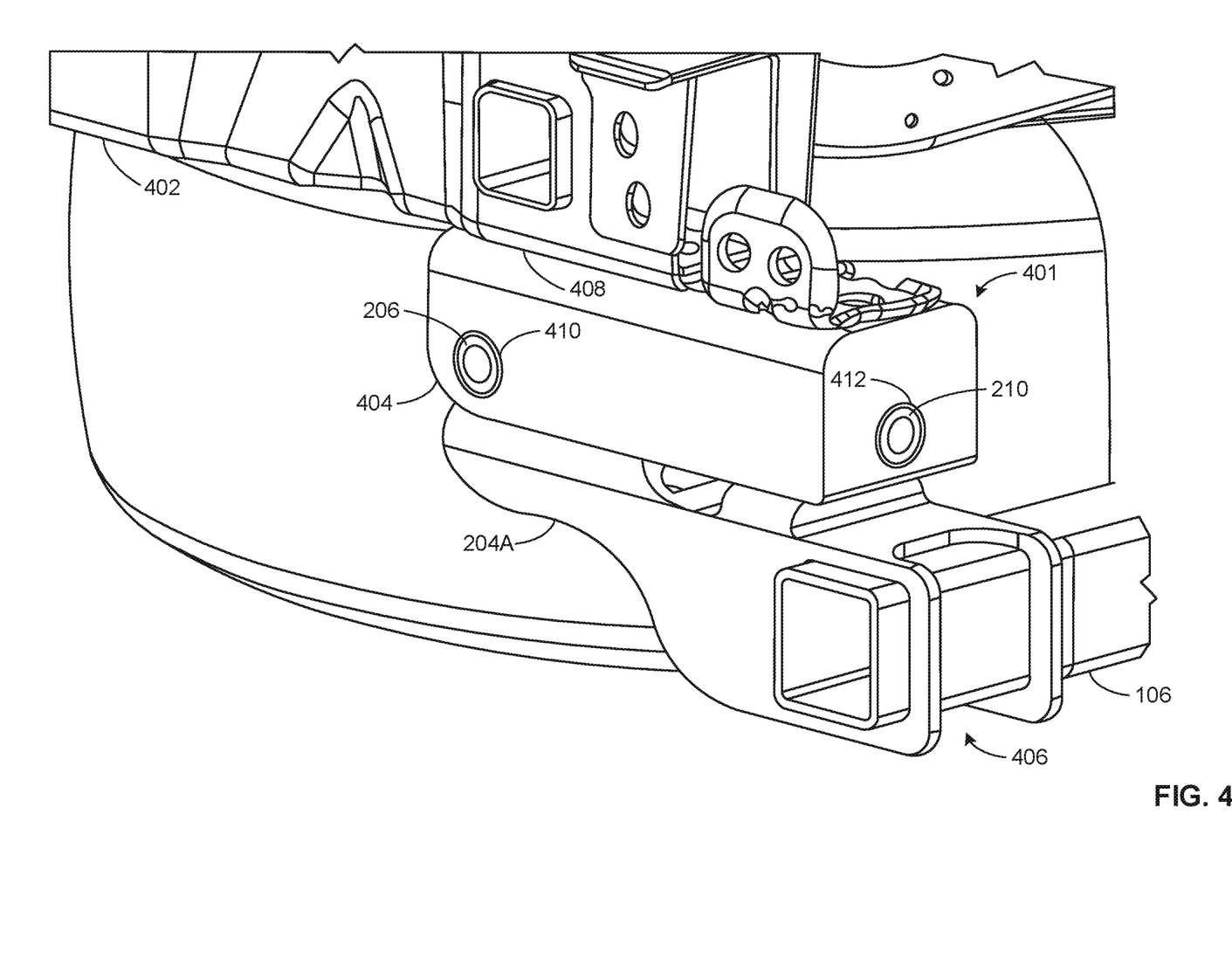
FIG. 4 illustrates an isometric view of a pin housing assembly coupled to a crossbar and outboard frame.

FIG. 4 illustrates an isometric view of a pin housing assembly 401 coupled to the crossbar 106 of FIGS. 1 and 2 and an example vehicle frame 402. The example pin housing assembly 401 includes the first load block 204A, the first pin 206, the third pin 210 and an example pin support 404. The example pin housing assembly 401 is coupled to the crossbar 106 via an example first connection 406. The example pin housing assembly 401 is further coupled to the frame 402 via an example third connection 408. The example pin support 404 includes an example first opening 410 and an example second opening 412.

The pin support 404 is coupled to the load block 204A via the first pin 206 and the third pin 210. In the illustrated example of FIG. 4, the pin support 404 acts as the load path between the load block 204A and the frame 402. For example, the load applied to the crossbar 106 (e.g., via a trailer coupled to the hitch 101, etc.) is transferred to the frame 402 via a load path sequentially including the cross bar 106, the load block 204A, the pins 206, 210, and the pin support 404. In such examples, all load transferred to frame 402 can be measured by the pins of the hitch (e.g., the pins 206, 208, 210, 212, etc.) of the hitch 101. In the illustrated example of FIG. 4, the first pin 206 is coupled to the pin support 404 via the first opening 410. In this manner, the opening 410 enables the first pin 206, the load block 204A and the pin support 404 to act as a clevis when the first pin 206 is inserted into the load block 204A and the pin support 404 via the first opening 410. In the illustrated example of FIG. 4, the third pin 210 is coupled to the pin support 404 via the second opening 412. In this manner, the second opening 412 enables the third pin 210, the load block 204A and the pin support 404 to act as a clevis when the first pin 206 is inserted into the load block 204A and the pin support 404 via the second opening 412.

In the illustrated example of FIG. 4, the pin support 404 is composed of cast iron. In other examples, the pin support 404 can be composed of any other suitable material or combination thereof (e.g., aluminum, steel, a plastic, a ceramic, etc.). In some examples, the pin support 404 is manufactured via stamping. In other examples, the pin support 404 can be manufactured via any suitable method of manufacture or combination thereof (e.g., weldment casting, extrusion, etc.). While one example implementation of the pin support 404 is illustrated in FIG. 2, the pin support 404 can have any other suitable shape, configuration, size, etc.

Figure 5:
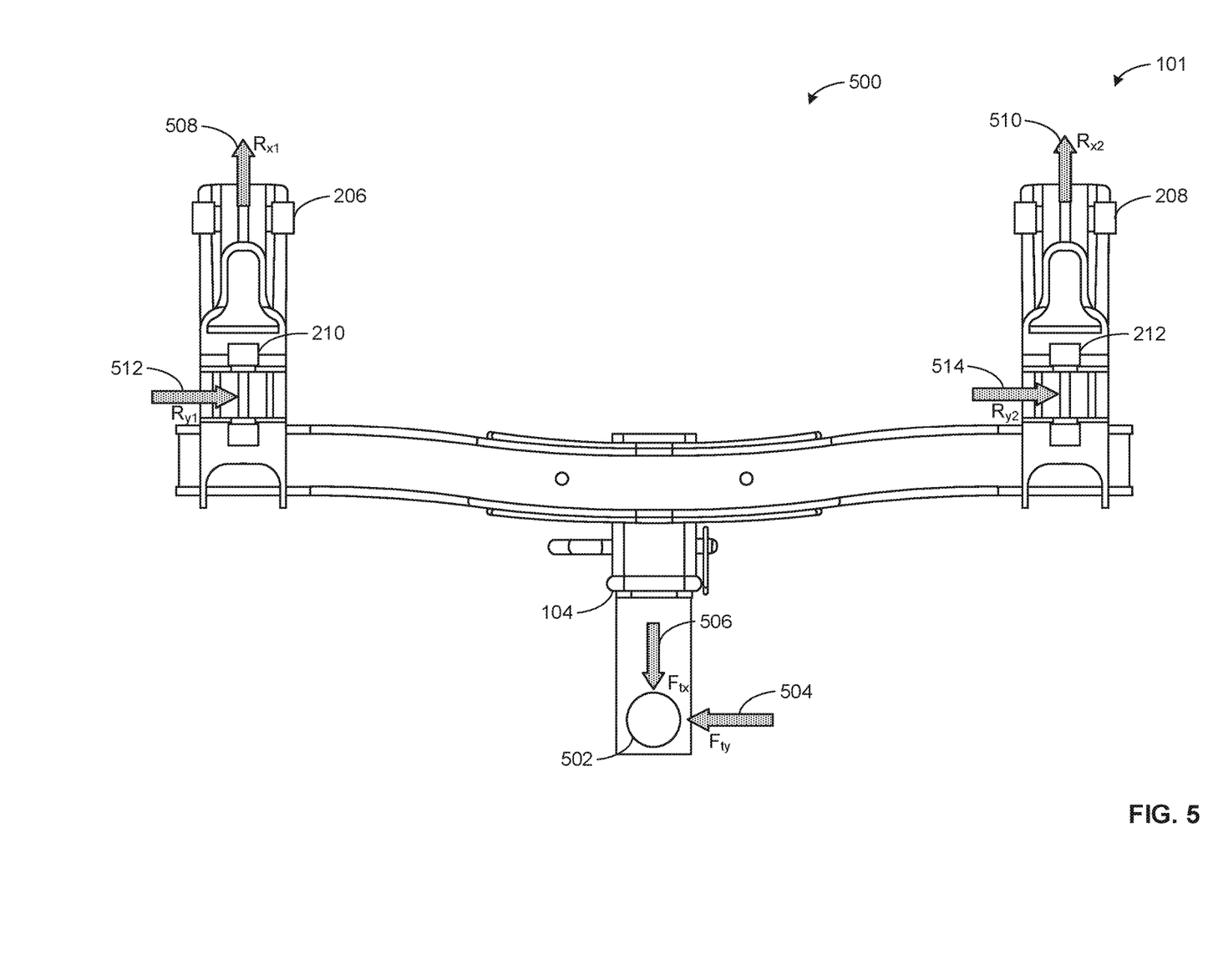
FIGS. 5-6 illustrate an example loading condition on a hitch ball associated with a trailer.

FIG. 5 is a top view of the hitch 101 illustrating an example loading condition 500 on the hitch 101 associated with a trailer and the corresponding reaction forces on the pins 206, 208, 210, 212. In the illustrated example of FIG. 5, the load condition 500 is based on a load applied to an example hitch ball 502, where the load is transmitted to the frame via the 206, 208, 210, 212. In the illustrated example, the load condition 500 is partly based on an example lateral load 504 and an example horizontal load 506 applied at the hitch ball 502, an example first horizontal reaction load 508 applied at the first pin 206, an example second horizontal reaction load 510 applied at the second pin 208, an example first lateral reaction load 512 applied at the third pin 210, and an example second lateral reaction load 514 applied at the fourth pin 212.

In the illustrated example, the first pin 206 reacts (e.g., carries, etc.) the example first horizontal reaction load 508. In the illustrated example, the second pin 208 reacts (e.g., carries, etc.) the example second horizontal reaction load 510. In the illustrated example, the third pin 210 reacts (e.g., carries, etc.) the example first lateral reaction load 512. In the illustrated example, the fourth pin 212 reacts (e.g., carries, etc.) the example second lateral reaction load 514. In the illustrated example examples, the first pin 206 and the second pin 208 do not react (e.g., carry, etc.) a lateral reaction load because the pins 206, 208 are oriented in a lateral direction (e.g., central axes of the first pin 206 and the second pin 208 are oriented along the lateral direction, etc.). In some examples, the third pin 210 and the fourth pin 212 do not react (e.g., carry, etc.) a horizontal reaction load because the pins 210, 212 are oriented in a horizontal direction (e.g., central axes of the third pin 210 and the fourth pin 212 are oriented in the horizontal direction, etc.).

The load manager 102 can use static equilibrium analysis (e.g., torque balancing, force balancing, etc.) to determine a magnitude of the applied loads 504, 506. For example, the applied lateral load 504 can be calculated using Equation (1):

$$\Sigma F_y = R_{y1} + R_{y2} - F_{ty} = 0 \quad (1)$$

where $\Sigma F_y$ is the sum of the forces in the lateral direction, $F_{ty}$ is the applied lateral load 504, $R_{y1}$ is the first lateral reaction load 512, and $R_{y2}$ is the second lateral reaction load 514. In this example, the applied lateral load 504 is equal and opposite to the sum of the lateral reaction loads 512, 514.

Similarly, the applied horizontal load 506 can be determined using static analysis using Equation (2):

$$\Sigma F_x = R_{x1} + R_{x2} - F_{tx} = 0 \quad (2)$$

where $\Sigma F_x$ is the sum of the forces in the horizontal direction, $F_{tx}$ is the applied horizontal load 506, $R_{x1}$ is the first horizontal reaction load 508, and $R_{x2}$ is the second horizontal reaction load 510. In this example, the applied horizontal load 506 is equal and opposite to the sum of the horizontal reaction loads 508, 510.

Figure 6:
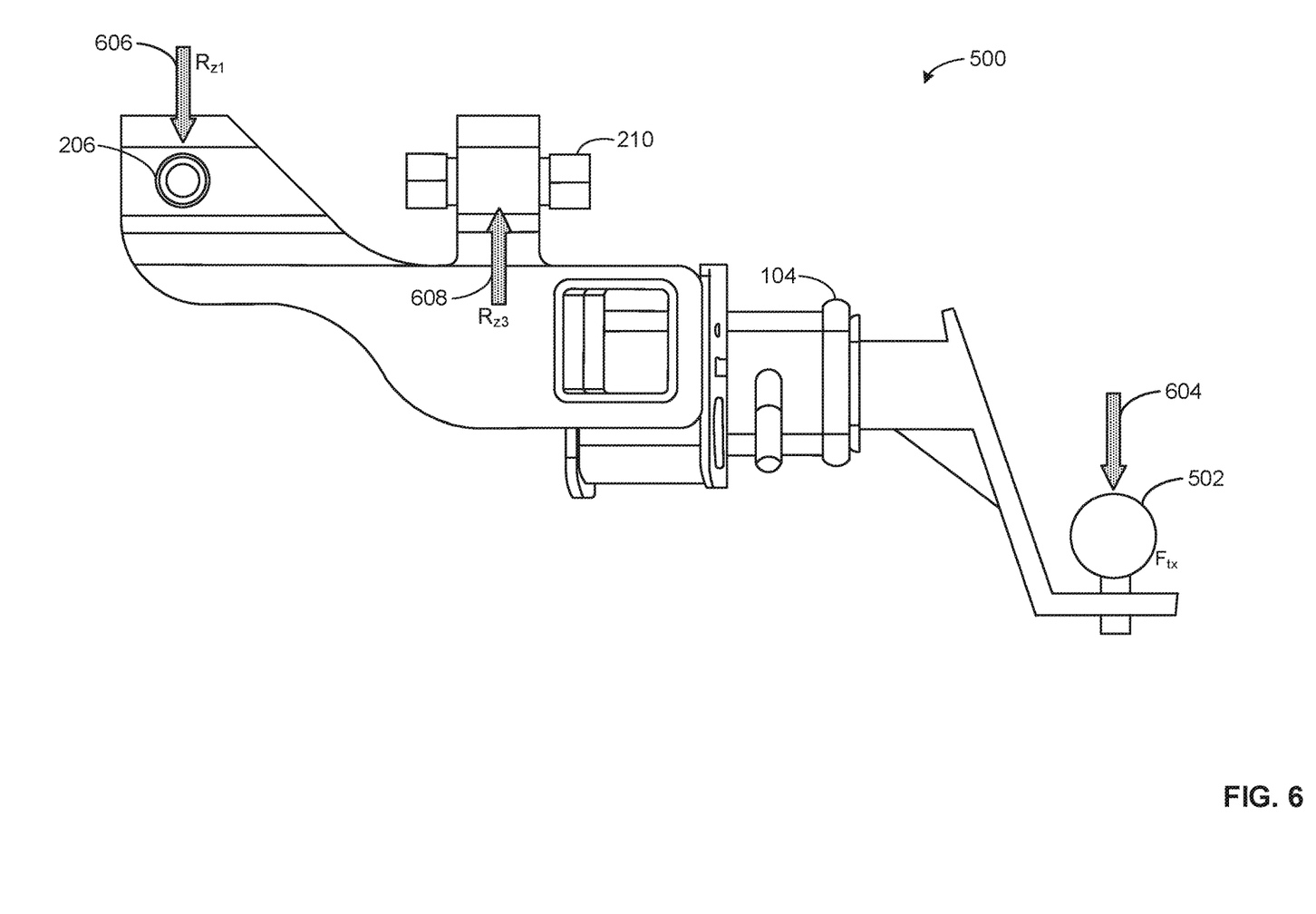

FIG. 6 is an example side view of the hitch 101 further illustrating the example loading condition 500 on the hitch ball 502 associated with a trailer. In the illustrated example of FIG. 6, the load condition 500 is based on a load applied to an example hitch ball 502, where the load is transmitted to the frame via the pins 206, 208, 210, 212. In the illustrated example, the load condition 500 is based on an example applied vertical load 604 applied at the hitch ball 502, an example first vertical reaction load 606 applied at the first pin 206, and an example second vertical reaction load 608 at the third pin 210. In the illustrated example of FIG. 6, the second pin 208 and the fourth pin 212 (e.g., pins coupled to the second load block 204B, etc.) are not illustrated but still react (e.g., carry, etc.) a portion (e.g., an equal portion, etc.) of the applied vertical load 604.

The load manager 102 can use static equilibrium analysis (e.g., torque balancing, force balancing, etc.) to determine a magnitude of the applied vertical load 604. For example, the applied vertical load 604 can be calculated using Equation (3):

$$\Sigma F_z = 2(R_{z4} - R_{z1}) - F_{tv} = 0 \quad (3)$$

where $\Sigma F_z$ is the sum of the forces in the vertical direction, $F_{tz}$ is the applied vertical load 604, $R_{z1}$ is the first horizontal reaction load 508, and $R_{z2}$ is the second vertical reaction load 608. In this example, because the hitch 101 is symmetrical about the receiver tube 104, the first vertical reaction load 606 acting on the first pin 206 can be assumed to be equal to the vertical reaction load acting on the second pin 208. Similarly, the second vertical reaction load 608 acting on the fourth pin 212 can be assumed to be equal to the vertical reaction load acting on the third pin 210. In this matter, the load manager 102 can determine the applied vertical load 604 is equal and opposite to two times the difference of the vertical reaction loads 606, 608. In other examples, the load manager 102 can determine the applied vertical load 604 by summing the vertical load of each of the pins 206, 208, 210, 212. In other examples, the load manager 102 can determine the applied vertical load 604 based on a calibration factor (e.g., accounting for manufacturing variances, etc.) determined during assembly. In such examples, the load manager 102 can determine the vertical load 604 using a force averaging algorithm.

In some examples, some of the pins 206, 208, 210, 212 may not include sensor elements. In such examples, the load manager 102 can further determine the load condition based on the location of the hitch ball 502 relative to the pins 206, 208, 210, 212. For example, the load manager 102 can incorporate rear view camera data to assist in determining the applied loads 504, 506. In such examples, the location of the applied load (e.g., the hitch ball 502 can be determined via the rear view camera data. In some examples, coupling of some of the pins 206, 208, 210, 212 to the load blocks 204A, 204B can prevent the pins 206, 208, 210, 212 from carrying force in a particular direction (e.g., a lateral direction, a horizontal direction, a vertical direction, etc.). For example, the interface between some of the pins 206, 208, 210, 212 and the load blocks 204A, 204B may be ovoid (e.g., elliptical, etc.) to prevent contact between a portion of pins 206, 208, 210, 212 and the load blocks 204A, 204B and thus prevent the pins 206, 208, 210, 212 from carrying a load in a corresponding direction. Additionally or alternatively, the load manager 102 can determine the load condition based on sensor data from one of the pins 206, 208 and one of the pins 210, 212. In such examples, the load manager 102 can base this determination off an assumption that the load associated with the hitch ball 502 is evenly distributed between the driver and passenger side of the hitch 101. In some such examples, the load manager 102 can further base the load condition off a calibration factor determined during manufacture to account for manufacturing tolerances.

Figure 7:
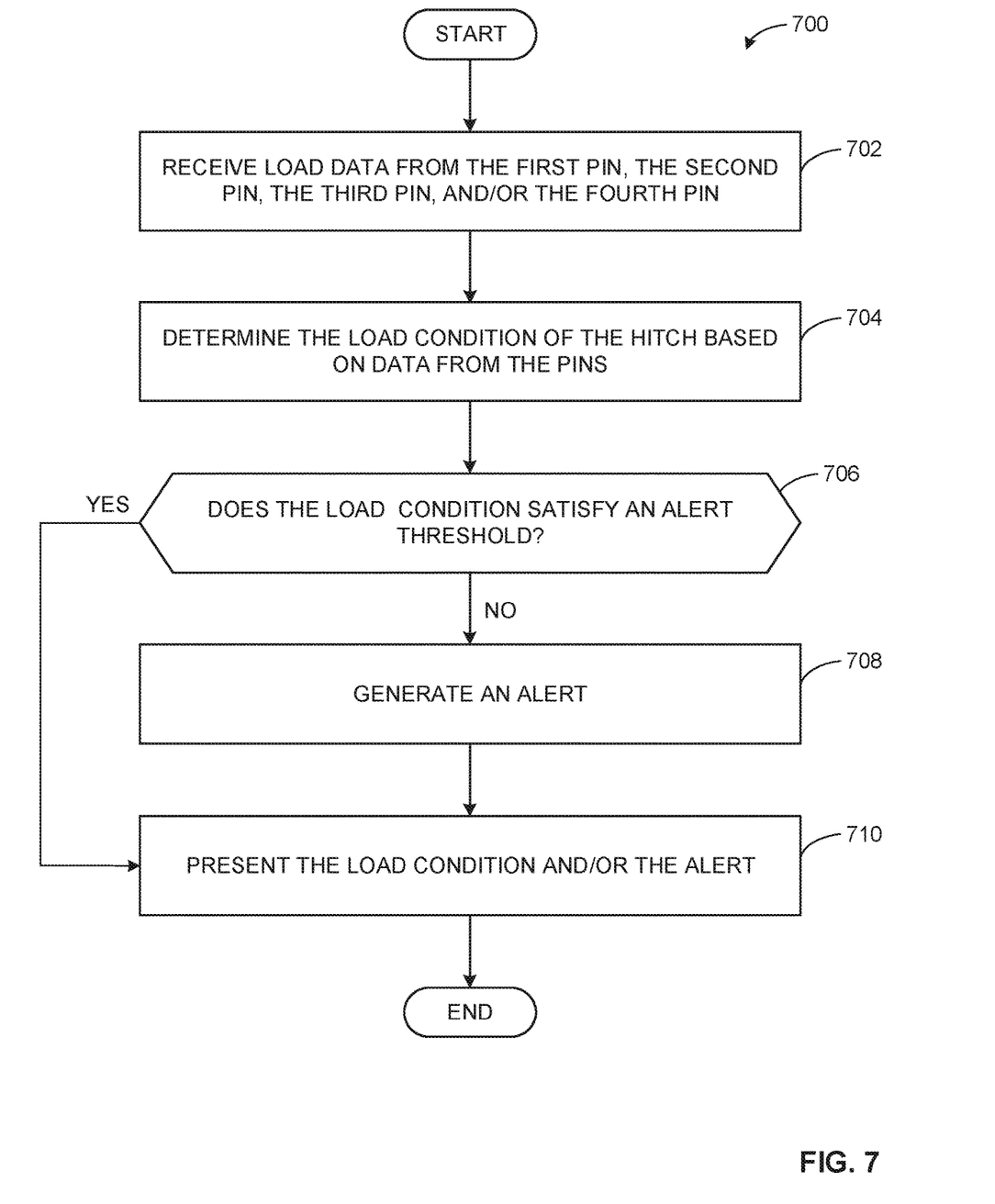
FIG. 7 is a flowchart representative of machine readable instructions that may be executed to implement the load manager of FIGS. 1A and 1B.

A flowchart representative of example methods, hardware implemented state machines, and/or any combination thereof for implementing the load manager 102 of FIGS. 1A and 1B is shown in FIG. 7. The method may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example load manager 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example method 700 of FIG. 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The method 700 of FIG. 7 begins at block 702. At block 702, the sensor interface 114 receives load data from the first pin 206, the second pin 208, the third pin 210 and/or the fourth pin 212. For example, the sensor interface 114 can receive data from the first pin 206, the second pin 208, the third pin 210 and/or the fourth pin 212 in an analog format (e.g., a voltage, etc.). In this example, the sensor interface 114 converts the analog format into a digital value (e.g., a force, a pressure, etc.).

At block 704, the load determiner 116 determines the load condition of the hitch 101 based on the data from the first pin 206, the second pin 208, the third pin 210 and/or the fourth pin 212. For example, the load determiner 116 can determine the load condition on the hitch 101 using static equilibrium analysis. For example, the load determiner 116 can use Equations (1)-(3) to determine the load condition. In some examples, the load determiner 116 can determine at least one of the vertical load condition, the horizontal load condition, and/or the lateral load condition. In such examples, the load determiner 116 can use any other suitable means to determine the load condition.

At block 706, the load determiner 116 determines if the load condition satisfies an alert threshold. In some examples, the alert threshold can correspond to the load condition being improper (e.g., misloaded, overloaded, etc.). If the load determiner 116 determines the load condition satisfies an alert threshold, the method 700 advances to block 710. If the load determiner 116 determines the load condition does not satisfies an alert threshold, the method 700 advances to block 712.

At block 708, the load determiner 116 generates an alert. For example, load determiner 116 can generate an audio alert, a visual alert, etc. In some examples, load determiner 116 can generate an alert including a description of the load condition triggering the alert. In some examples, load determiner 116 can generate an instruction indicating how to correct the load condition.

At block 710, the example vehicle interface 118 presents the load condition and/or alert. For example, the vehicle interface 118 can cause the vehicle 100 to present the load condition and/or the alert. For example, the vehicle interface 118 can cause the example display 110 to present the generated alert to a user of the vehicle 100.

Figure 8:
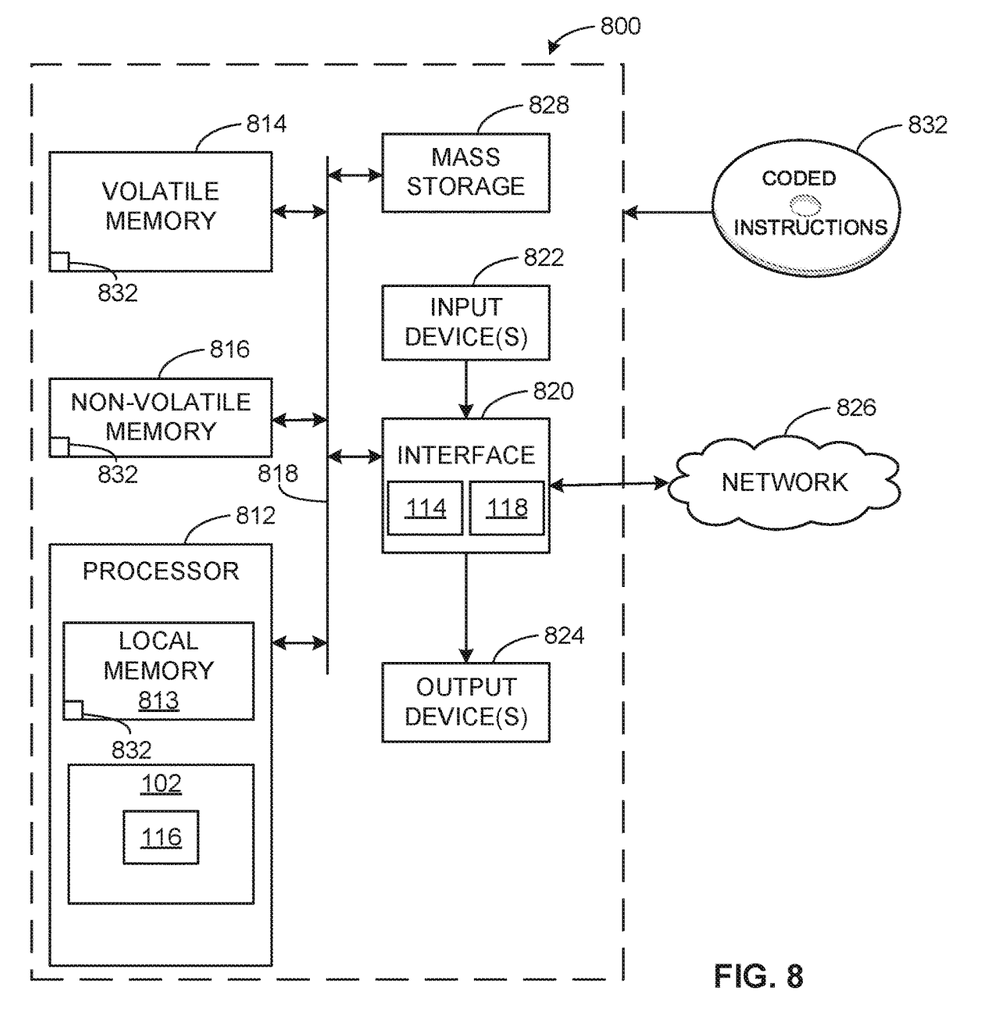
FIG. 8 is a block diagram of an example processing platform structured to execute the instructions of FIG. 7 to implement the load manager of FIGS. 1A and 1B.

FIG. 8 is a block diagram of an example processor platform 800 structured to execute the method 600 of FIG. 6 to implement the load manager 102 of FIG. 1B. The processor platform 800 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example load determiner 116.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 820 implements the example sensor interface 114 and the example vehicle interface 118.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 8 may be stored in the mass storage device 828, in the volatile memory 814, in the non-volatile memory 816, and/or on a removable non-transitory computer readable storage medium such as a CD or DVD.

Example methods, apparatus, systems, and articles of manufacture for a hitch including multiple pins coupled to an outboard frame are disclosed herein. Further examples and combinations thereof include the following:

Example 1 includes an apparatus comprising a hitch including a first pin, a second pin parallel to the first pin, a third pin orthogonal to the first pin, and a fourth pin parallel to the third pin, wherein the first pin, the second pin, the third pin and the fourth pin are to couple the hitch to a frame of a vehicle, and a load manager to determine a load condition based on sensor data from at least one of the first pin, the second pin, the third pin, or the fourth pin.

Example 2 includes the apparatus of example 1, wherein the first pin and the third pin are disposed within a first assembly, and the second pin and the fourth pin are disposed within a second assembly.

Example 3 includes the apparatus of example 2, wherein the first assembly is to be disposed on a driver side of the vehicle and the second assembly is to be disposed on a passenger side of the vehicle.

Example 4 includes the apparatus of example 2, further including a crossbar extending between the first assembly and the second assembly.

Example 5 includes the apparatus of example 1, further including a receiver tube, the load condition based on a trailer coupled to the apparatus via the receiver tube.

Example 6 includes the apparatus of example 5, wherein the first pin and the second pin are parallel to the receiver tube.

Example 7 includes the apparatus of example 1, wherein at least one of the first pin, the second pin, the third pin, and the fourth pin include at least one force sensor.

Example 8 includes the apparatus of example 1, wherein the first pin and the second pin are at a first horizontal position and the third pin and the fourth pin are at a second horizontal position.

Example 9 includes the apparatus of example 8, wherein the first horizontal position is closer to a front of the vehicle than the second horizontal position.

Example 10 includes an apparatus comprising a load block, a first mounting ear extending from the load block, a second mounting ear extending from the load block, a pin adapter to be coupled to a vehicle frame, a first pin coupled to the pin adapter and the first mounting ear, and a second pin coupled to the pin adapter and the second mounting ear.

Example 11 includes the apparatus of example 10, wherein the first pin is orthogonal to the second pin.

Example 12 includes the apparatus of example 11, wherein the first pin is oriented along a lateral axis and the second pin is oriented along a horizontal axis.

Example 13 includes the apparatus of example 11, wherein the first pin, the first mounting ear, and the pin adapter form a first clevis and the second pin, the second mounting ear, and the pin adapter form a second clevis.

Example 14 includes the apparatus of example 10, wherein the first pin is disposed closer to a front of the vehicle frame than the second pin.

Example 15 includes the apparatus of example 10, wherein at least one of the first pin or the second pin includes a sensor.

Example 16 includes the apparatus of example 10, wherein the load block includes an opening to receive an end of a crossbar.

Example 17 includes a method comprising determining a load condition of a hitch based on data received from at least one of a first pin, a second pin, a third pin or a fourth pin of the hitch, the first pin, the second pin, the third pin, and the fourth pin form a load path between the hitch and a frame of a vehicle, the first pin parallel to the second pin, the first pin orthogonal to the third pin, and in response to the load condition satisfying an alert threshold, alerting a user of the load condition.

Example 18 includes the method of example 17, wherein the first pin and the second pin are disposed on a driver side of the frame and the third pin and the fourth pin are disposed on a passenger side of the frame.

Example 19 includes the method of example 17, wherein the load condition is based on a trailer coupled to a receiver tube of the hitch.

Example 20 includes the method of example 17, wherein the first pin and the second pin are at a first horizontal position and the third pin and the fourth pin are at a second horizontal position, the first horizontal position is closer to a front of the vehicle than the second horizontal position.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a load block;
    a first mounting ear extending from the load block;
    a second mounting ear extending from the load block;
    a pin support to be coupled to a vehicle frame;
    a first pin coupled to the pin support and the first mounting ear; and
    a second pin coupled to the pin support and the second mounting ear, the first pin orthogonal to the second pin.

2. The apparatus of claim 1, wherein the first pin is oriented along a lateral axis and the second pin is oriented along a horizontal axis.

3. The apparatus of claim 1, wherein the first pin, the first mounting ear, and the pin support form a first clevis and the second pin, the second mounting ear, and the pin support form a second clevis.

4. The apparatus of claim 1, wherein the first pin is disposed closer to a front of the vehicle frame than the second pin.

5. The apparatus of claim 1, wherein at least one of the first pin or the second pin includes a sensor.

6. The apparatus of claim 1, wherein the load block includes an opening to receive an end of a crossbar.

7. A hitch comprising:
a crossbar;
a receiver tube; and
a first pin housing assembly coupled to a first end of the crossbar, the first pin housing assembly including:
 a load block;
 a first mounting ear extending from the load block;
 a second mounting ear extending from the load block;
 a pin support to be coupled to a vehicle frame;
 a first pin coupled to the pin support and the first mounting ear; and
 a second pin coupled to the pin support and the second mounting ear.

8. The hitch of claim 7, wherein the first pin is orthogonal to the second pin.

9. The hitch of claim 8, wherein the first pin is oriented along a lateral axis and the second pin is oriented along a horizontal axis.

10. The hitch of claim 7, wherein the first pin, the first mounting ear, and the pin support form a first clevis and the second pin, the second mounting ear, and the pin support form a second clevis.

11. The hitch of claim 7, wherein the first pin is disposed closer to a front of the vehicle frame than the second pin.

12. The hitch of claim 7, wherein at least one of the first pin or the second pin includes a sensor.

13. The hitch of claim 7, wherein the load block includes an opening to receive the first end of the crossbar.

14. A vehicle comprising:
a vehicle frame; and
a hitch coupled to the vehicle frame, the hitch including:
 a load block;
 a first mounting ear extending from the load block;
 a second mounting ear extending from the load block;
 a pin support to be coupled to the vehicle frame;
 a first pin coupled to the pin support and the first mounting ear; and
 a second pin coupled to the pin support and the second mounting ear, the first pin orthogonal to the second pin.

15. The vehicle of claim 14, wherein the first pin is oriented along a lateral axis and the second pin is oriented along a horizontal axis.

16. The vehicle of claim 14, wherein the first pin, the first mounting ear, and the pin support form a first clevis and the second pin, the second mounting ear, and the pin support form a second clevis.

17. The vehicle of claim 14, wherein the first pin is disposed closer to a front of the vehicle frame than the second pin.

18. The vehicle of claim 14, wherein the load block includes an opening to receive an end of a crossbar of the hitch.

* * * * *